United States Patent [19]

Kurosawa et al.

[11] Patent Number: 4,873,295

[45] Date of Patent: Oct. 10, 1989

[54] NOVEL POLYETHER SULFONE IMIDE COPOLYMERS

[75] Inventors: Shigeru Kurosawa; Kunio Matsuki, both of Ohita, Japan

[73] Assignee: Showa Denko Kabushiki Kaisha, Tokyo, Japan

[21] Appl. No.: 822,934

[22] Filed: Jan. 27, 1986

Related U.S. Application Data

[63] Continuation of Ser. No. 729,077, Apr. 30, 1985, abandoned, which is a continuation of Ser. No. 573,790, Jan. 25, 1984, abandoned.

[30] Foreign Application Priority Data

Jan. 25, 1983 [JP] Japan ................................. 58-9426

[51] Int. Cl.$^4$ .............................................. C08G 75/23
[52] U.S. Cl. ..................................... 525/420; 528/172
[58] Field of Search ...................... 528/170, 172, 188; 525/419, 422, 486, 397, 420

[56] References Cited

U.S. PATENT DOCUMENTS

| | | | |
|---|---|---|---|
| 3,234,181 | 2/1966 | Oliver | 528/353 |
| 3,563,951 | 2/1971 | Radlmann et al. | 528/172 |
| 3,658,938 | 4/1972 | Kwiatkowski et al. | 528/172 |
| 3,753,948 | 8/1973 | Brude et al. | 528/172 |
| 3,817,921 | 6/1974 | Brude et al. | 528/172 |
| 3,988,374 | 10/1976 | Brude et al. | 528/172 |
| 4,064,289 | 12/1977 | Yokoyama et al. | 528/172 |
| 4,405,770 | 9/1983 | Schoenberg et al. | 528/172 |

*Primary Examiner*—Veronica P. Hoke
*Attorney, Agent, or Firm*—Sughrue, Mion, Zinn, Macpeak & Seas

[57] ABSTRACT

Polyether sulfone imide copolymers having excellent mechanical strength, heat resistance and heat aging resistance and enhanced processability are disclosed, which are composed of recurring units of the following formulae (I) and (II)

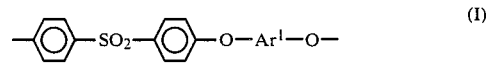

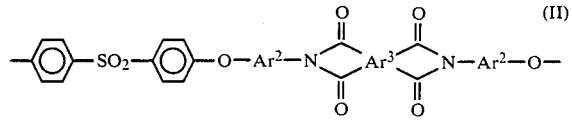

wherein $Ar^1$ represents a residue of a dihydric phenol, $Ar^2$ represents a residue of an aminophenol, and $Ar^3$ represents a residue of an aromatic tetracarboxylic acid.

28 Claims, 2 Drawing Sheets

NOVEL POLYETHER SULFONE IMIDE COPOLYMERS

This is a continuation of application Ser. No. 729,077 filed 4/30/85, which is a continuation of application Ser. No. 573,790 filed 1/25/84 now abandoned.

FIELD OF THE INVENTION

This invention relates to a polyether sulfone imide copolymer composed of an arylene ether sulfone bond and an arylene ether sulfone imide bond, which has excellent mechanical strength, heat resistance and heat aging resistance and enhanced processability.

BACKGROUND OF THE INVENTION

Methods for producing polyarylene ether resins are described, for example, in Japanese patent publication No. 21458/71 (U.S. Pat. Nos. 4,108,837 and 4,175,175) and *Polymer*, Vol. 18, page 359 (1977). As is well known, these polymers have already been commercially available and gained acceptance in various industrial fields.

With an advance in electric and electronic technology, the requirement of various industries for the properties of plastic materials has become increasingly rigorous, and for example, improved heat resistance, mechanical strength and solvent resistance have been desired. The industries are therefore looking forward to the development of materials which meet such a requirement.

Polyimide having the following recurring units

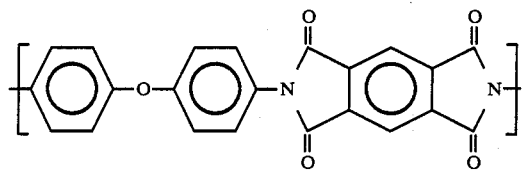

is known to have excellent heat resistance and durability, but it has poor moldability. Further, since it does not melt, it cannot be molded by a usual injection molding technique. Moreover, it is insoluble in a solvent. Hence, one is compelled to resort to a complex process in the formation of polyimide film which comprises, for example, dissolving a polyamide acid intermediate (a polyimide precursor) in a solvent, forming a film from the solution, and then heat-treating the film.

Attempts have been made to improve the melt moldability of polyimide, but it has not been entirely successful to impart melt moldability while retaining the high heat resistance of polyimide. G. L. Brode et al. reported a polyimide resin derived from a diamine containing an ether bond and a sulfone bond and an aromatic tetracarboxylic anhydride, but stated that molding means for thermosplastic resins cannot be used for this polyimide resin (*J. Polym. Sci., Poly. Chem.*, Vol. 12, pages 575–587 (1974)). In an attempt to improve the moldability of polyimide, a polyimide resin from benzophenonetetracarboxylic acid, methylenedianiline and tolylenediamine has also been used in practical application as described in *Plastic Age*, 1983, May 98. Because of its poor flowability, however, it is difficult to mold by injection molding or extrusion as in ordinary thermoplastic resins.

As shown above, it is extremely difficult to obtain polymers containing an aromatic imide bond and having good moldability although it is not certain whether the difficulty is due to a cross-linking reaction during polymerization or during molding.

A. Takekoshi et al. disclose in Japanese patent application (OPI) No. 103997/74 (corresponding to U.S. patent application Ser. No. 319,371 filed Dec. 29, 1972) that a polyimide from a specified aromatic tetracarboxylic acid represented by the following formula:

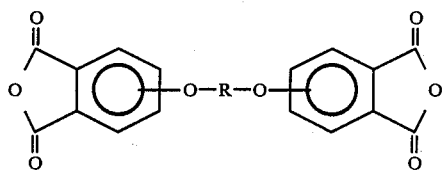

wherein R represents a residue of a dihydric phenol and an ordinary aromatic diamine can be melt-molded. But this is a very rare case wherein a polyimide could be put to practical use by introducing the residue of a dihydric phenol into the tetracarboxylic acid component and thereby rendering the polymer thermoplastic.

SUMMARY OF THE INVENTION

An object of this invention is to provide a novel polyether sulfone imide copolymer which can be produced from easily available raw materials and has excellent mechanical strength, heat resistance and heat aging resistance and improved moldability.

The above object is achieved by a novel copolymer composed of recurring units of the following formulae (I) and (II):

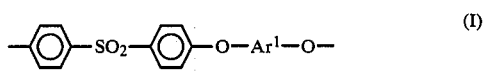

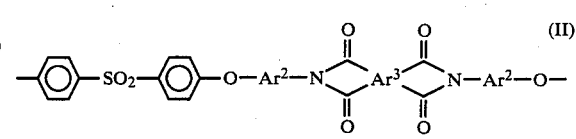

wherein $Ar^1$ represents a residue of a dihydric phenol, $Ar^2$ represents a residue of an aminophenol, and $Ar^3$ represents a residue of an aromatic tetracarboxylic acid.

DETAILED DESCRIPTION OF THE INVENTION

Figure 1:
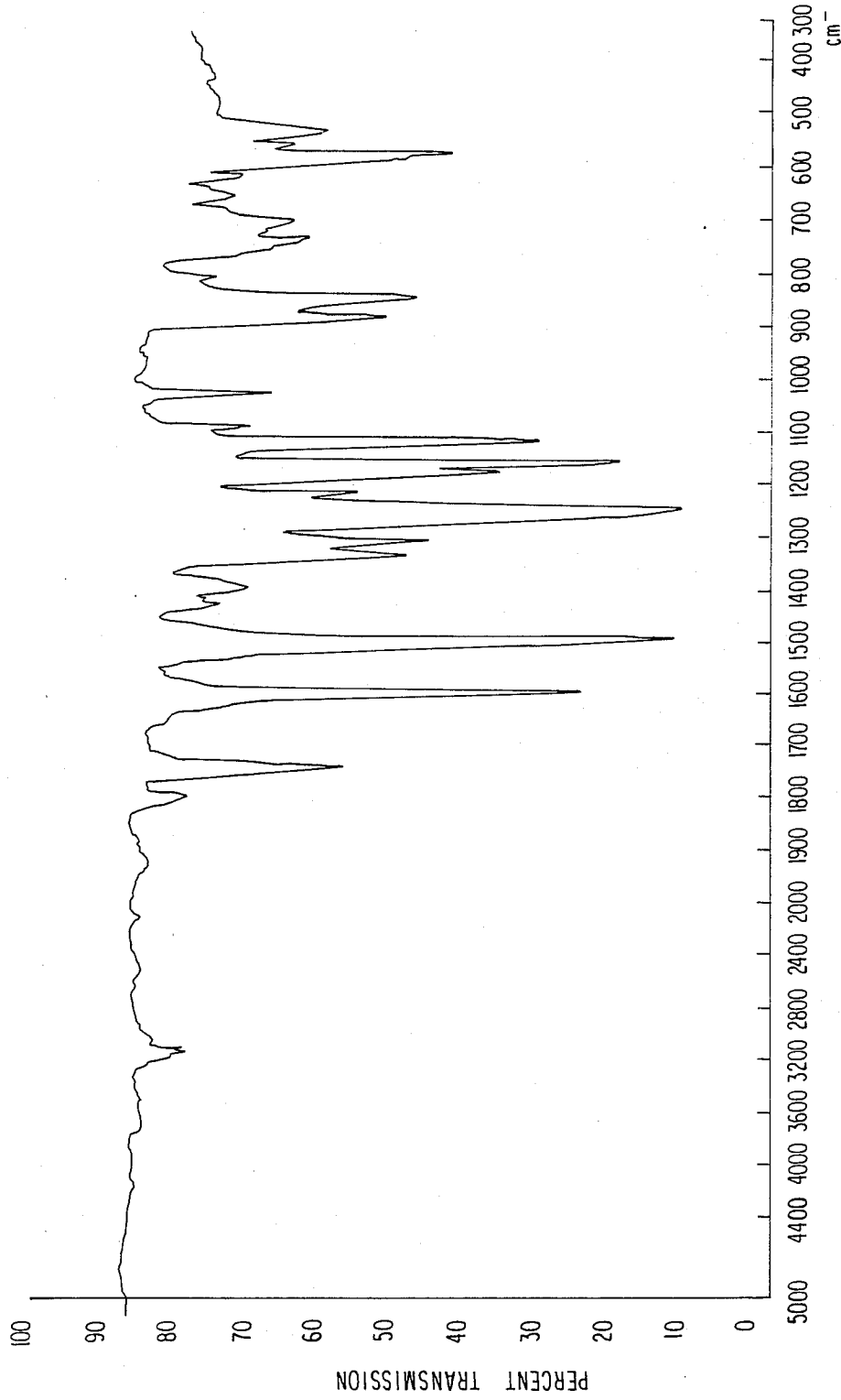
FIGS. 1 and 2 show the infrared absorption spectrums of the copolymers obtained in Example 1 and Example 5, respectively.

In the recurring units of formula (I), $Ar^1$ represents a residue of a dihydric phenol. Preferred examples include those represented by the following formulae:

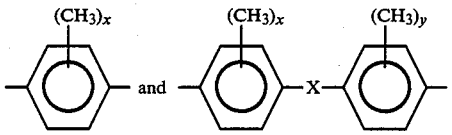

wherein X represents a direct bond, —O—, —S—, —SO$_2$—, —CO—, or an alkylene or alkylidene group having 1 to 6 carbon atoms and x and y independently represent 0, 1 or 2. Of these,

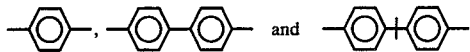

are more preferred.

Copolymers in which the residue of a dihydric phenol has no aliphatic groups (i.e., a methyl group as the substituent, an alkylene or alkylidene group as —X—), such as

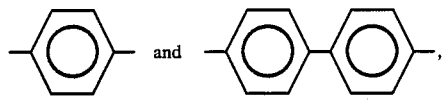

are particularly preferred. Such a residue generally provides copolymers having a high glass transition temperature, high impact strength and good heat aging resistance.

In the recurring units of formula (II), Ar$^2$ represents a residue of an aminophenol. Preferred examples include

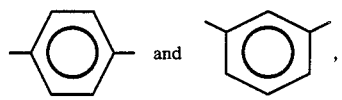

and p-phenylene group is more preferred to m-phenylene group because the resulting copolymer has a higher glass transition temperature.

In formula (II), Ar$^3$ is a residue of an aromatic tetracarboxylic acid, examples of which include

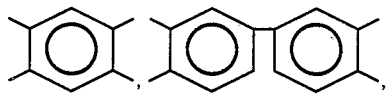

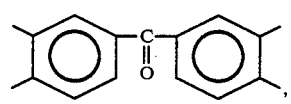

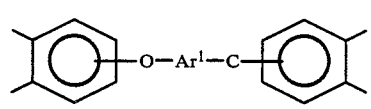

wherein Ar$^1$ is as defined above. Of these,

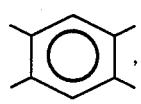

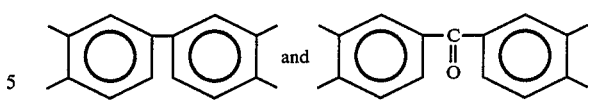

are particularly preferred.

The copolymer of the invention is composed of the recurring units of formulae (I) and (II). The mole ratio of the recurring units of formula (I) to the recurring units of formula (II) is preferably 95/5 to 20/80, more preferably 90/10 to 40/60, most preferably 85/15 to 50/50. In general, as the proportion of the recurring units of formula (II) increases, the glass transition temperature of the copolymer tends to become higher although this varies somewhat depending upon the type of the group Ar$^3$ in formula (II). But when the proportion of (II) exceeds 80 mole%, a copolymer may form which has reduced moldability.

The resistance of the copolymer to solvents generally becomes higher as the proportion of the units of formula (II) increases, but is not entirely good when the proportion of the units (II) is less than 5 mole%. The copolymer shows satisfactory resistance to solvents when the proportion of the units (II) exceeds 10 mole%. The solvent resistance of the copolymer is especially outstanding when the group Ar$^1$ does not include the aliphatic group and the proportion of the units (II) is at least 10 mole%.

It has been found that the copolymer of this invention has good moldability, whereas a polymer composed only of the units of formula (II) is difficult to mold, and that the copolymer of this invention has better mechanical properties than a polymer composed only of the other units of formula (I). The mechanical properties of the copolymer is especially outstanding in impact strength. For example, a polysulfone polymer composed of only the structural units of formula (I) in which Ar$^1$ is

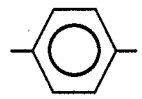

and which has an inherent viscosity ($\eta_{inh}30°\ C.^{NMP}$) of 0.72 has an Izod impact strength of 7.8 Kg.cm/cm, whereas a copolymer in accordance with this invention composed of the recurring units of formulae (I) and (II) ((I)/(II)=75/25 by mole;

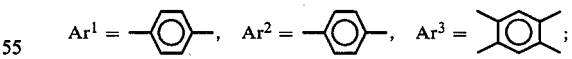

$\eta_{inh}30°\ C.^{NMP}$=0.56) has an Izod impact strength of as high as 36 Kg.cm/cm.

The solubility of the copolymer of this invention in a solvent decreases generally as the proportion of the units of formula (II) increases. Copolymers of this invention in which the proportion of the units (II) is low are soluble in N-methylpyrrolidone even at room temperature, but some do not show solubility in N-methylpyrrolidone when the proportion of the units (II) increases. Such copolymers have been found to be soluble in a mixed solvent of m-cresol and p-chlorophenol (1/5 by weight).

Copolymers of this invention which are soluble in N-methylpyrrolidone at 30° C. preferably have an inherent viscosity ($\eta_{inh}$) in N-methylpyrrolidone at 30° C. of at least 0.35. Those which are insoluble in N-methylpyrrolidone at 30° C. preferably have an inherent viscosity in m-cresol/p-chlorophenol (1/5 by weight) at 30° C. of at least 0.3.

The inherent viscosity is given by the following equation:

$$\eta_{inh} = \frac{\ln(t/t_o)}{C}$$

wherein $t_o$ is the effluent time of the solvent in a viscometer, t is the effluent time of the copolymer solution in the viscometer, and C is the concentration of the copolymer solution, 0.5 g/dl.

The copolymer of this invention is produced, for example, by reacting monomers of formulae (III) and (IV) (hereafter referred to as monomers (III) and (IV), respectively).

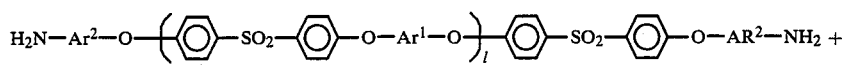

(III)

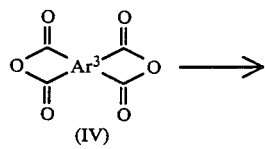

(IV)

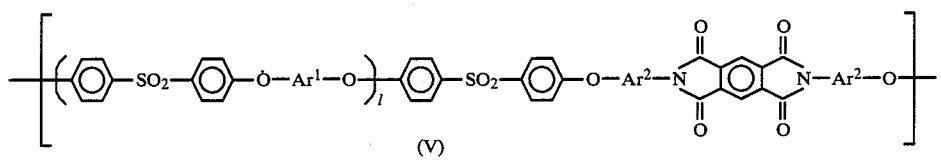

(V)

In formulae (III), (IV) and (V), $Ar^1$, $Ar^2$ and $Ar^3$ are as defined above. The monomer (III) is a mixture of ether sulfone diamines having a molecular weight distribution, in other words, a mixture of those having various numbers of the recurring unit

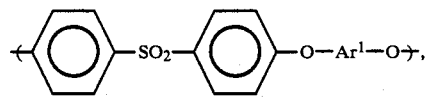

generally ranging from 0 to 50, and l is an average value thereof which is a real number of not more than 30, preferably from 0.25 to 19 and more preferably from 0.67 to 9.

The monomer (III) is an ether sulfone diamine which can be easily obtained by reacting a dyhydric phenol, an aminophenol and 4,4'-dichlorodiphenylsulfone in the presence of an alkali metal compound such as an alkali hydroxide, an alkali carbonate or an alkali bicarbonate in a dipolar neutral solvent such as dimethylacetamide, N-butylpyrrolidone, dimethylsulfoxide and sulfolane. One example of its synthesis is shown in *J. Polym. Sci. Polym. Chem. Edition,* Vol. 12, pages 565–573 (1974).

The monomer (IV) is an aromatic tetracarboxylic anhydride. Examples include pyromellitic anhydride, 3,3',-4,4'-diphenyltetracarboxylic anhydride, 3,3',4,4'-benzophenonetetracarboxylic anhydride and compounds of the following formula (VI)

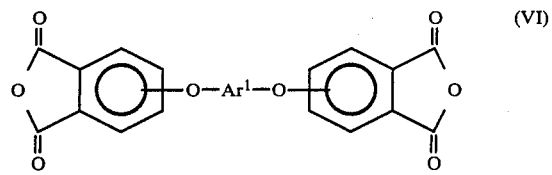

wherein $Ar^1$ is as defined above.

As described below, there are some embodiments of performing the above reaction, and these embodiments can be properly selected according to the purpose or the properties of the resulting copolymer. The reaction involves the following two steps.

(1) The monomers (III) and (IV) are subjected to addition-reaction to form a polyamide acid as an intermediate.

(2) The polyamide acid intermediate is dehydrocyclized to form a polyimide.

The mode of practice slightly differs depending upon the states in which the reactions in (1) and (2) are carried out. The following methods have been found to be applicable to the production of the copolymers of this invention.

(1) Polymerization in a dipolar neutral solvent

The reaction (1) can be carried out in a stable, inert dipolar neutral solvent. Preferred dipolar neutral solvents are those which dissolve the monomers (III) and (IV) and the resulting polyamide acid. The dipolar neutral solvent is generally used in an amount of one to twenty times the weight of polyamide acid produced. Examples of dipolar neutral solvent include dimethylformamide, dimethylacetamide, N-methylpyrrolidone and sulfolane, preferably N-methylpyrrolidone and sulfolane.

The addition-reaction temperature is 0° to 50° C., preferably 5° to 40° C. The suitable reaction time is 1 to 10 hours.

The resulting polyamide acid solution may be subjected as such to the reaction (2). Alternatively, the resulting polyamide acid may be recovered from the reaction mixture and then subjected to the reaction (2).

The resulting polyamide acid, in the form of a solution, a solid or a melt, can be chemically or thermally dehydro-imidized to form a polyimide.

The thermal dehydroimidization can be effected by heating the polyamide acid at a temperature of 120° to 380° C. and removing the resulting water under atmospheric or reduced pressure, preferably under reduced pressure.

When the polyamide acid is subjected to the thermal dehydroimidization in the form of a solution, removal of the resulting water may be carried out by using an azeotropic dehydrating solvent. Use of this solvent is effective for carrying out the imidization reaction in the presence of a dipolar neutral solvent and removing the resulting water out of the system, and more specifically, for performing the imidization at a temperature of 120° to 200° C., preferably 120° to 160° C., and obtaining the resulting polyimide as a solution. Examples of the azeotropic dehydrating solvent include toluene, xylene and chlorobenzene. The resulting polyimide solution may be used as such. Alternatively, it may be separated from the solution by using a non-solvent for the copolymer, such as water, alcohols (e.g., methanol or iso-butanol), and ketones (e.g., acetone and methyl ethyl ketone).

When dehydroimidization in solution is not required, the polyamide acid formed in the reaction (1) may be heated in the form of a film, a coating, a powder or a melt and heated at a temperature suitable for the respective form of the polyamide acid which is within the range of 150° to 380° C., preferably 200° to 360° C., thereby dehydroimidizing it.

The polyamide acid obtained by performing the reaction (1) in a dipolar neutral solvent may be chemically dehydroimidized. Acetic anhydride is preferred as a dehydrating agent. The amount of the dehydrating agent is at least equivalent to the amide acid bond, preferably 1.2 to 2 equivalents. It is preferred that the reaction be promoted by using a catalyst such as a tertial amine (e.g., pyridine and trialkylamines). The catalyst is generally used in an amount of not less than 1 mole%, preferably not less than 5 mole%, based on the amount of dehydrating agent. The reaction temperature is 5° to 60° C., preferably 10° to 50° C. The resulting polyimide may be recovered by using a non-solvent in the same way as stated above.

(2) Polymerization in a phenolic solvent

It has been found that the copolymer of this invention can also be produced by performing the reactions (1) and (2) in a phenolic solvent. Examples of the phenolic solvent include phenol, o-, m- or p-cresol, cresylic acid, and o- or p-chlorophenol. Those which dissolve the monomer (III) and the resulting polyimide, such as m- or p-cresol and p-chlorophenol, are preferred.

It has been found that the polyimide can be obtained within a very short period of time by reacting the monomers (III) and (IV) in the copresence of the phenolic solvent and the azeotropic dehydrating solvent at a temperature at which imidization takes place to perform the reactions (1) and (2) substantially simultaneously, and removing out of the system the resulting water as an azeotrope with the azeotropic dehydrating solvent.

The azeotropic dehydrating solvent is the same as stated above.

The amount of the phenolic solvent used is 2 to 20 times, preferably 3 to 8 times, the weight of the resulting polyimide.

The temperature is 120° to 200° C., preferably 130° to 180° C., and the reaction time is 1 to 10 hours.

Further, the copolymer of this invention can be obtained by reacting the monomers (III) and (IV) in the phenolic solvent in the same way as in the case of producing the polyamide acid in a dipolar neutral solvent and subsequently thermally dehydroimidizing the polyamide acid using an azeotropic dehydrating solvent except that the phenolic solvent is used instead of the dipolar neutral solvent.

The polyimide may be recovered from the resulting polyimide solution by pouring it into a non-solvent such as an alcohol, a ketone or an aromatic hydrocarbon.

(3) Polymerization in the absence of solvent

The copolymer of this invention can also be obtained by heating a mixture of the monomers (III) and (IV) in the absence of solvent.

The reaction is carried out at a temperature above the melting point (softening point when it does not show a clear melting point) of the monomer (III), and preferably at a temperature above the glass transition temperature of the resulting polyimide. At a temperature below the melting point (or softening point) of the monomer (III), the reaction is slow and is not practical. More specifically, the polymerization reaction is carried out at 150° to 380° C., preferably 200° to 370° C., most preferably 280° to 360° C. The reaction temperature, however, differs slightly depending upon the combination of the monomers (III) and (IV).

The polymerization is preferably carried out in an atmosphere of an inert gas. The inclusion of oxygen promotes coloration of the resulting polymer and is not desirable.

The monomer (IV) is highly sublimable. Since the scattering of the monomer (IV) out of the system by sublimation greatly changes the mole ratio between the monomers (III) and (IV), some measure must be taken to prevent it. Under the aforesaid polymerization conditions, the reactions (1) and (2) proceed simultaneously. Water generated by the reactions may be removed under reduced pressure.

To perform the polymerization reaction uniformly, the reaction mixture is preferably stirred or kneaded.

An ordinary autoclave may be used as the polymerization apparatus. Alternatively, a vent-equipped extruder may be used.

Since the copolymer obtained by this polymerization method does not contain solvent, it can be directly used as a molding material.

In practicing this polymerization method, not more than 10% by weight, based on the resulting copolymer, of a flowability improver may be added in order to facilitate stirring or kneading of the reaction mixture. Preferably, however, the flowability improver is removed from the resulting copolymer prior to processing it into a final desired product.

The flowability improver is preferably a stable organic compound substantially non-reactive with the monomers (III) and (IV) and the resulting copolymer. Typical illustrative examples of the flowability improver include stable aromatic compounds such as diphenyl, diphenyl ether and diphenylmethane and the polymerization solvents cited hereinabove.

Some typical methods of polymerization which can be used in producing the copolymers of this invention have been described above. Some common requirements in practicing the present invention will now be described.

In the production of the copolymer from the monomers (III) and (IV), there is a latitude in the mole ratio of these monomers. The molecular weight of the resulting polymer can be controlled by the mole ratio (R) of monomer (III) to monomer (IV), and the R varies greatly depending upon the molecular weight of monomer (III). Monomers (III) and (IV) are used so that R satisfies the following expression:

$$\frac{1}{1.1 + 0.05\ l} \leq R \leq \frac{1}{0.9 - 0.05\ l}$$

Preferably, R is a value which satisfies the following expression:

$$\frac{1}{1.04 + 0.02\ l} \leq R \leq \frac{1}{0.96 - 0.02\ l}$$

In the above expressions, l is as defined hereinabove.

In producing the copolymer of this invention, the reactions may be carried out in the presence of a primary aromatic amine such as aniline or an aromatic ortho-dicarboxylic anhydride such as phthalic anhydride in order to control the molecular weight of the copolymer or stabilize its ends.

The polyether sulfone imide copolymer of this invention can be molded into various shapes by melt-molding, or molding means using a solvent. The molded articles can be used as various industrial materials such as electrical and electronic component parts, automotive electrical parts, aircraft component parts and precision parts.

Ordinary polyimide polymers are generally molded into films by the casting method using a solvent. By contrast, the copolymer of this invention can be molded into films of high performance by a melt-molding technique when its structure and molecular weight are properly chosen. This is very advantageous both in cost and in performance.

The following Examples illustrate the modes of practice of the present invention more specifically. It should be understood that these examples do not in any way limit the scope of the invention.

EXAMPLE 1

Synthesis of Ether Sulfone Diamine

A 2-liter flask equipped with a stirrer, a N₂ introducing inlet, a condenser and a thermometer was charged with 21.8 g (0.20 mole) of p-aminophenol, 167.6 g (0.90 mole) of 4,4'-biphenol, 287.2 g (1.00 mole) of 4,4'-dichlorodiphenylsulfone, 145.1 g (1.05 moles) of anhydrous potassium carbonate and 1,200 g of sulfolane. The mixture was reacted at 180° to 200° C. for 5 hours while it was fully stirred in an atmosphere of N₂. The reaction product was poured into water and recovered. On drying at 60° C. for 20 hours, 398.2 g (yield 98.6%) of ether sulfone diamine (A) was obtained. The diamine had an average molecular weight of 4,366 (theoretical molecular weight 4,036) determined by titration with a 1/100N solution of perchloric acid-acetic acid.

The resulting compound has the following structure (VII) in which n is 9.8 as an average value.

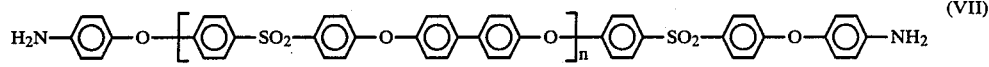

(VII)

Synthesis of Polyether Sulfone Imide

A 2-liter flask equipped with a stirrer, a N₂ introducing inlet and a thermometer was charged with 87.32 g (0.02 mole) of ether sulfone diamine synthesized as above and 750 g of dimethylacetamide. They were stirred in a N₂ atmosphere to form a uniform solution. The solution was cooled and maintained at 5° to 10° C. Pyromellitic anhydride (4.36 g; 0.0198 mole) was added at such a speed that the temperature of the inside of the flask did not rise. The mixture was stirred for 2.5 hours, and 0.6 g (0.004 mole) of phthalic anhydride was further added. The mixture was reacted further for 1 hour. Acetic anhydride (51.0 g; 0.50 mole) and 4 g of pyridine were added to the resulting reaction mixture, and the mixture was further stirred for 8 hours at 20° to 30° C.

The resulting reaction mixture was poured into 10 times its amount of methanol to precipitate the copolymer. The copolymer was fully pulverized, and then repeatedly washed with 2 liters of methanol. It was then dried in vacuum at 170° C. for 15 hours to give 90.4 g of a yellow copolymer (designated as copolymer (A)) having the following recurring unit.

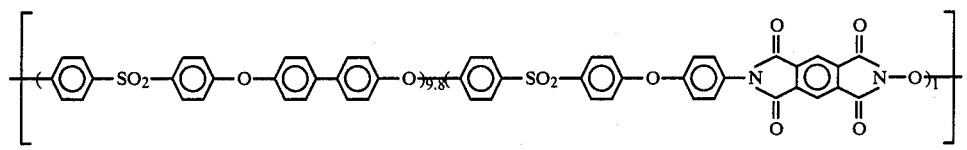

The infrared absorption spectrum of the copolymer is shown in FIG. 1.

The copolymer has an inherent viscosity ($\eta_{inh}^{30°C.\ NMP}$) of 0.60, determined in N-methylpyrrolidone at a temperature of 30° C. and a concentration of 0.5 g/dl (unless otherwise indicated, the term "inherent viscosity" used hereinafter has the same meanings as above).

The copolymer had a glass transition temperature (Tg) of 240° C., measured by a differential scanning calorimeter (made by Perkin Elmer Company).

The copolymer could be pelletized to obtain a clear yellowish brown pellet using a 20 m/m φ extruder (barrel temperature 365° C.; dice temperature 360° C.; 50 rpm).

The copolymer was subjected to heat-pressing at 370° C. to prepare test samples having thickness of 1 mm and 3 mm, and the properties of test samples were measured. The results are shown below.

| | |
|---|---|
| Yield strength | 695 kg/cm² |
| Breaking strength | 604 kg/cm² |
| Breaking extention | 68% |
| Izod impact strength (notched) | 63.3 kg·cm/cm |

Samples were also prepared as above from the copolymer and comparative materials, and their heat aging resistances were measured. The results are shown in Table 1. The results show that the copolymer of the invention retains high impact strength at high temperatures.

The resistances of copolymer (A) and a polymer composed only of the recurring units of formula (I) (to be referred to as polydiphenylenesulfone) to various solvents were examined, and the results are summarized in Table 2.

TABLE 1

Impact Strength after Aging at 180° C.

| Polymer | Izod Impact Strength (notched, kg · cm/cm) | | | |
|---|---|---|---|---|
| | Before aging | 1 day after aging at 180° C. | 7 days after aging at 180° C. | 60 days after aging at 180° C. |
| Copolymer A (Comparative polymer) | 63.1 | 30.4 | 22.1 | 15.6 |
| Polydiphenylene-sulfone (*1) (Comparative polymer) | 61.5 | 10.8 | 11.9 | 8.5 |
| Polyethersulfone (*2) | 5.4 | 3.4 | 3.1 | 3.0 |

(*1) Polymer of

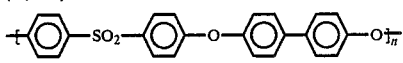

(Inherent viscosity: 0.54)

(*2) Polymer of

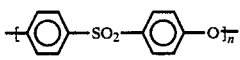

(Inherent viscosity: 0.46)

EXAMPLE 2

A 1-liter flask equipped with a stirrer, a $N_2$ introducing inlet, a water collector having a condenser attached to its end, and a thermometer was charged with 2.18 g (0.02 mole) of p-aminophenol, 16.76 g (0.09 mole) of 4,4'-biphenol, 28.72 g (0.10 mole) of 4,4'-dichlorodiphenylsulfone, 16.33 g (0.20 mole) of a 49% by weight aqueous solution of sodium hydroxide, 120 g of sulfolane and 150 ml of toluene.

The temperature was gradually raised while bubbling $N_2$. When the temperature of the inside of the flask reached 110° to 120° C., a toluene-water azeotrope was distilled out, and water was collected at the water collector. The toluene was recycled to use the reaction system. When the amount of water collected reached 11.5 ml, recycling of the distilled toluene to the reaction system was stopped, and the toluene in the reaction mixture was distilled out. At the same time, the temperature was gradually raised, and in 0.5 hour, the temperature of the inside of the flask was raised to 180° C. The reaction was carried out at 180° C. for 5 hours to terminate the synthesis of ether sulfone diamine.

The reaction mixture was cooled to 100° C., and 240 g of sulfolane was added. They were fully stirred to form a uniform solution.

The diluted reaction solution was cooled to 40° C., and 2.11 g (0.0096 mole) of pyromellitic anhydride was gradually added. The reaction was carried out at this temperature for 2 hours to give a viscous solution.

To this solution was added 0.6 g (0.004 mole) of phthalic anhydride, and the reaction was further carried out for 1 hours to give an end-capped polyether sulfone amide acid solution.

Acetic anhydride (51.0 g; 0.50 mole) and 4 g of pyridine were added to the solution, and the mixture was stirred at 40° C. for 6 hours to terminate the reaction.

The resulting reaction mixture was diluted with 100 ml of sulfolane, and the precipitated sodium chloride was removed by filtration. The filtrate was poured into 10 times its amount of water.

The precipitated copolymer was separated by filtration, pulverized by a mixer, and repeatedly washed with water. Water was removed fully, and the copolymer was washed with 500 ml of methanol, separated by filtration, and dried in vacuum at 180° C. for 20 hours to give 39.7 g of a yellow powder.

The resulting copolymer had an inherent viscosity of 0.56 and Tg of 240.5° C.

The infrared absorption spectrum of the resulting copolymer was substantially the same as that of the copolymer obtained in Example 1.

EXAMPLE 3

Ether sulfone diamine (320.3 g; yield 99.1%) was synthesized in the same way as in Example 1 except that the amount of p-aminophenol was changed to 65.4 g (0.60 mole) and the amount of 4,4'-biphenol was changed to 130.3 g (0.70 mole).

The average molecular weight of the diamine determined by titration was 3,475 (theoretical molecular weight 3,232). This shows that n in formula (VII) is 7.6 as an average value.

The resulting ether sulfone diamine (69.5 g; 0.02 mole) and 4.33 g (0.0197 mole) of pyromellitic anhydride were reacted in the same way as in Example 1, and further 0.75 g (0.005 mole) of phthalic anhydride was reacted to perform capping. The reaction product was dehydroimidized with acetic anhydride-pyridine, and the resulting polymer was recovered. It was dried in vacuum at 180° C. for 15 hours to give 72.7 g of a yellow powder having the following recurring unit.

The copolymer had an inherent viscosity of 0.54, and Tg of 243° C.

Test samples were obtained in the same manner as in Example 1, and their properties were measured.

| | |
|---|---|
| Yield strength | 711 kg/cm$^2$ |
| Breaking strength | 580 kg/cm$^2$ |
| Breaking extension | 50% |
| Izod impact strength | 30.7 kg.cm/cm |

The solvent resistance of the copolymer is shown in Table 2.

TABLE 2

| Solvent | Solvent Resistance | | |
|---|---|---|---|
| | Copolymer of Example 1 | Copolymer of Example 3 | Polydiphenylene-sulfone (*) |
| 1,2-Dichloroethane | No deformation | No change | Whitened |
| Chlorobenzene | No change | No change | Deformed |
| Acetone | No deformation | No change | Deformed |
| Carbon tetrachloride | No change | No change | No change |
| Chloroform | Swollen | No deformation | Partly dissolved |
| Dimethylformamide | Swollen | Swollen | Partly dissolved |

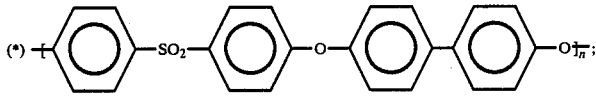

Inherent viscosity = 0.52

EXAMPLE 4

A 2-liter flask equipped with a stirrer, a $N_2$ introducing inlet, a condenser and a thermometer was charged with 111.7 g (0.60 mole) of 4,4'-biphenol, 229.7 g (0.80 mole) of 4,4'-dichlorodiphenylsulfone, 116.1 g (0.84 mole) of anhydrous potassium carbonate and 1,000 g of sulfolane.

The mixture was reacted at 180° to 200° C. for 5 hours while it was fully stirred in an atmosphere of $N_2$. To the reaction mixture was added 44.1 g (0.404 mole) of p-aminophenol, and the reaction was further carried out at 200° C. for 4 hours. The reaction product was poured into a large amount of water, recovered and fully washed with hot water. On drying at 130° C. for 20 hours, 320.2 g (yield 98.0%) of ether sulfone diamine was obtained. The diamine had an average molecular weight of 1,683 (theoretical molecular weight 1,634) determined by titration. The compound was an ether sulfone diamine represented by formula (III) wherein $Ar^1$ was

$Ar^2$ was

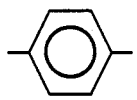

and l was 3.12.

The resulting ether sulfone diamine (92.6 g; 0.055 mole), 10.9 g (0.05 mole) of pyromellitic anhydride and 900 g of N-methylpyrrolidone (polymerization solvent) were reacted in the same manner as in Example 1. Subsequently, 7.4 g (0.05 mole) of phthalic anhydride, 16.8 g (0.165 mole) of acetic anhydride and 4 g of pyridine were added thereto in the same manner as in Example 1 to carry out the reaction.

The resulting reaction mixture was poured into 1.5 l of acetone to precipitate the copolymer which was separated by filtration and fully washed with acetone to obtain a yellow copolymer powder. By drying it at 170° C. for 15 hours, 102.6 g of polyether sulfone imide having an inherent viscosity of 0.505 and Tg of 250° C. was obtained.

EXAMPLE 5

The same procedure as in Example 4 was repeated to synthesize 267.3 g (yield 95.1%) of a dry ether sulfone diamine (B) except that 66.1 g (0.60 mole) of hydroquinone was used in place of 4,4'-biphenol. The diamine had an average molecular weight of 1,431 (theoretical molecular weight 1,406), determined by titration with perchloric acid using m-cresol as a solvent.

The resulting compound was an ether sulfone diamine (B) represented by formula (III) wherein $Ar^1$ and $Ar^2$ were

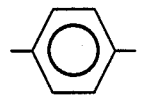

and l was 3.08. The results of elemental analysis of the compound are shown below.

| | |
|---|---|
| Found | C: 66.59%; H: 4.10%; N: 1.94% |
| Cald. | C: 66.68%; H: 4.01%; N: 1.96% |

Then, a 2-liter flask equipped with a stirrer, a $N_2$ introducing inlet, a thermometer and a water collector having a condenser attached to its end was charged with 151.7 g (0.106 mole) of ether sulfone diamine (B) and 860 g of m-cresol, followed by heating at 100° C. in a $N_2$ atmosphere to obtain a uniform solution. To the solution were added 21.8 g (0.100 mole) of pyromellitic anhydride and 290 g of toluene, and the temperature was gradually raised with thoroughly stirring. When the temperature of the inside of the flask reached 155° to 160° C., a toluene-water azeotrope was distilled out, and water was collected at the water collector. The toluene was recycled to the reaction system. After the reaction was carried out under the condition for 4 hours, 8.90 g (0.06 mole) of phthalic anhydride was added to the reaction system and the reaction was further continued for 1 hour. Then, recycling of the distilled toluene to the reaction system was stopped. The temperature of the inside of the flask was gradually raised to 190° C. so that water and almost toluene were distilled out of the reaction system. The amount of water collected was 3.7 ml, which was almost equal to the theoretical amount of water released.

The reaction mixture was cooled to 30° C., and 900 ml of acetone was added thereto with stirring, whereby a fine powdery yellow copolymer was precipitated. The precipitated copolymer was separated by filtration and washed with 500 ml of acetone for 1 hour with stirring. This procedure was repeated twice using a fresh acetone. On drying at 170° C. for 20 hours under vacuum, 162.4 g of polyether sulfone imide having an inherent viscosity of 0.445 and Tg of 238.5° C. was obtained.

Figure 2:
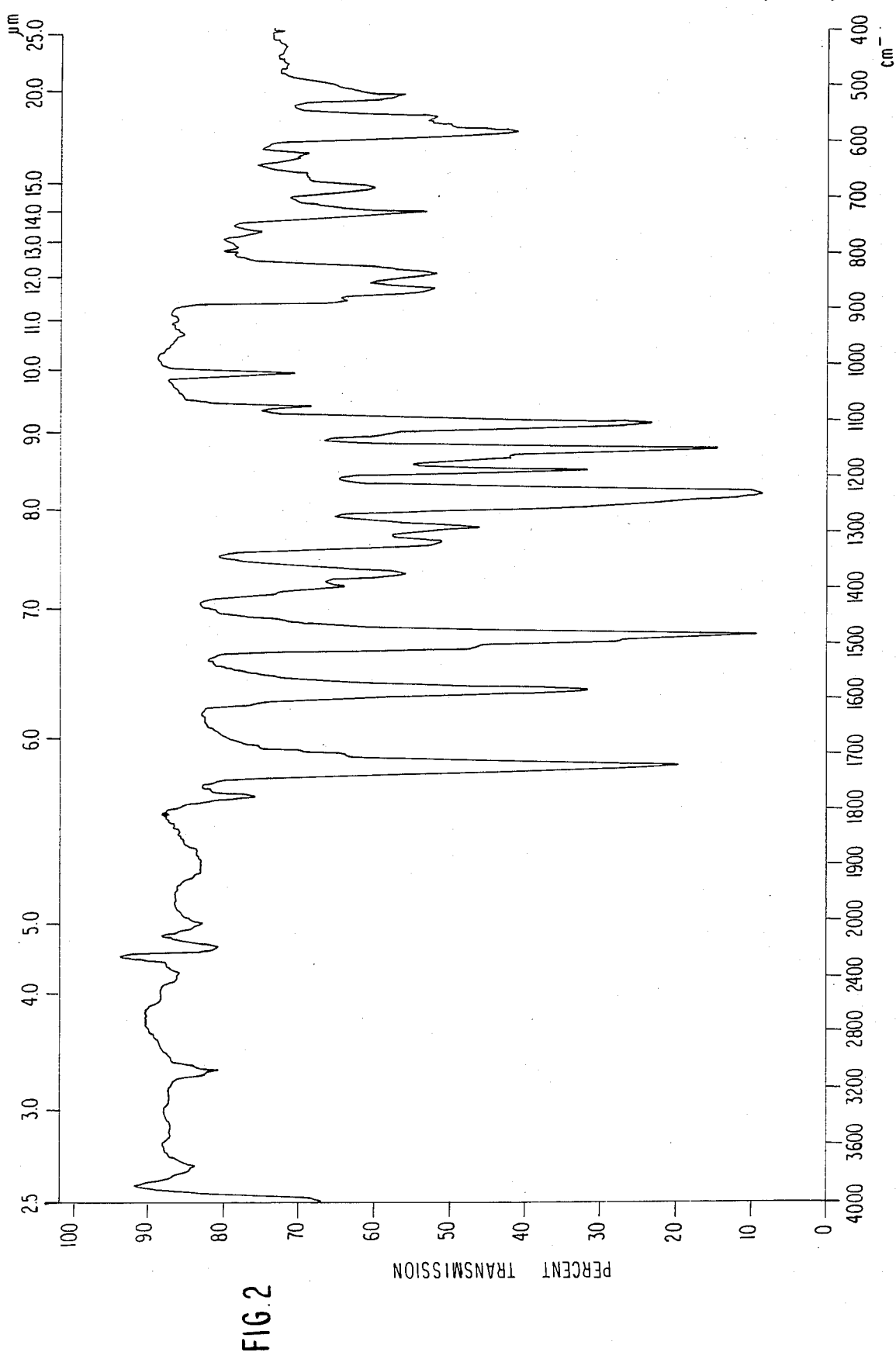

The infrared absorption of the copolymer is shown in FIG. 2. Further, the results of elementary analysis of the copolymer are shown below.

| Found | C: 66.53%; H: 3.46%; N: 1.66% |
|---|---|
| Cald.* | C: 66.60%; H: 3.38%; N: 1.74% |

*For $C_{89.44}H_{54.96}N_2S_{4.08}O_{20.32}$

In view of the chemical structures of the starting monomers, the reaction manner, the IR spectrum and elemental analysis of the copolymer obtained, it is apparent that the copolymer has the following recurring unit:

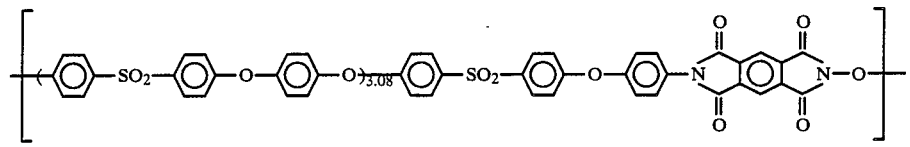

The copolymer could be pelletized to obtain a clear yellowish brown pellet using a 13 m/m φ extruder (barrel temperature 350° C.; dice temperature 350° C.).

The thus obtained pellet was subjected to heat-pressing at 350° C. to prepare test samples, and their properties were measured. The results are shown in Table 3.

For comparison, a polysulfone having an inherent viscosity of 0.721 and Tg of 199.7° C. was synthesized using hydroquinone and 4,4'-dichlorodiphenylsulfone as comonomers, and the properties are also shown in Table 3.

The results show that the polyether sulfone imide of this invention has not only high Tg but also extremely high impact strength, as compared to the polysulfone which corresponds to that having no imido structure in this invention.

TABLE 3

| Properties | Copolymer of Example 5 | Poly-sulfone (*1) |
|---|---|---|
| Inherent Viscosity | 0.445 | 0.721 |
| Glass Transition Temperature (Tg) (°C.) | 240.5 | 199.7 |
| Mechanical Strength: | | |
| Yield strength (kg/cm²) | 765 | 774 |
| Breaking strength (kg/cm²) | 690 | 700 |
| Breaking extension (%) | 77 | 70 |
| Izod impact strength (Notched) (kg · cm/cm) | 19.6 | 7.8 |
| Solvent Resistance (*2) | | |
| Methylene chloride | not changed | whitened |

TABLE 3-continued

| Properties | Copolymer of Example 5 | Poly-sulfone (*1) |
|---|---|---|
| Chloroform | slightly softened | " |
| Carbon tetrachloride | not changed | not changed |
| Chlorobenzene | " | swollen |
| Toluene | " | not changed |
| Methyl ethyl ketone | " | whitened |
| Acetone | " | whitened |
| Ethyl acetate | " | not changed |

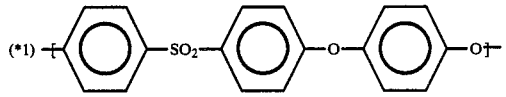

(*2) A 1 mm-thick test sample was immersed in the solvent at 30° C. for 24 hours.

EXAMPLE 6

The same procedure as in Example 5 was repeated except that 73.0 (0.051 mole) of ether sulfone diamine (B), 10.9 g (0.05 mole) of pyromellitic anhydride, 1.48 g (0.01 mole) of phthalic anhydride, 750 g of m-cresol and 190 g of toluene were used, whereby 77.5 g of polyether sulfone imide was synthesized. The copolymer had an inherent viscosity of 0.561 and Tg of 244° C.

The copolymer was then subjected to heat-pressing at 360° C. to prepare test samples, and their properties were measured. The results are shown below.

| Yield strength | 756 kg/cm² |
|---|---|
| Breaking strength | 674 kg/cm² |
| Breaking extention | 90% |
| Izod impact strength (notched) | 35 kg.cm/cm |

EXAMPLES 7-13

The same procedure as in Example 4 are repeated wherein 4,4'-dichlorodiphenylsulfone, a dihydric phenol and potassium carbonate were fully reacted, followed by adding an aminophenol thereto, whereby various ether sulfone diamines as shown in Table 4 were synthesized.

Using these ether sulfone diamines, various polyether sulfone imide were obtained according to a polymerization method as used in Example 5 wherein a phenolic solvent was used as a polymerization solvent. The results are shown in Table 5. The polymerization temperature, polymerization time and the reaction procedure were the same as in Example 5

TABLE 4

| | Synthesis of Ether Sulfone Diamine | | | | | | | |
|---|---|---|---|---|---|---|---|---|
| Amount of 4,4'-dichlorodiphenyl-sulfone (g) | Kind and amount of dihydric phenol (g) | Kind and amount of aminophenol (g) | Amount of K₂CO₃ (g) | Kind and amount of reaction solvent (g) | Ether sulfone diamine produced | | | |
| | | | | | Amount (g) | Average molecular weight | 1 | Designation |
| 143.6 (0.50 mole) | 4,4'-Biphenol 74.5 (0.40 mole) | p-Aminophenol 22.0 (0.202 mole) | 73.2 (0.53 mole) | Sulfolane 800 | 196.5 | 2,103 | 4.14 | C |
| 143.6 (0.50 mole) | 4,4'-Biphenol 55.9 (0.30 mole) | p-Aminophenol 44.1 (0.404 mole) | 73.2 (0.53 mole) | Sulfolane 800 | 194.8 | 1,052 | 1.53 | D |

TABLE 4-continued

| | | Synthesis of Ether Sulfone Diamine | | | Ether sulfone diamine produced | | | |
|---|---|---|---|---|---|---|---|---|
| Amount of 4,4'-dichlorodiphenyl-sulfone (g) | Kind and amount of dihydric phenol (g) | Kind and amount of aminophenol (g) | Amount of K₂CO₃ (g) | Kind and amount of reaction solvent (g) | Amount (g) | Average molecular weight | l | Designation |
| 143.6 (0.50 mole) | Hydroquinone 49.5 (0.45 mole) | p-Aminophenol 11.0 (0.101 mole) | 73.2 (0.53 mole) | N—Methylpyrrolidone 700 | 162.7 | 3,425 | 9.20 | E |
| 143.6 (0.50 mole) | Hydroquinone 33.0 (0.30 mole) | p-Aminophenol 4.41 (0.404 mole) | 73.2 (0.53 mole) | N—Methylpyrrolidone 700 | 176.4 | 942 | 1.54 | F |
| 172.30 (0.60 mole) | 4,4'-Dihydroxy-diphenylsulfone 125.1 (0.50 mole) | p-Aminophenol 22.0 (0.202 mole) | 91.2 (0.66 mole) | Sulfolane 1100 | 266.7 | 2,799 | 5.09 | G |
| 114.9 (0.40 mole) | 4,4'-Dihydroxy-diphenylsulfone 75.1 (0.30 mole) | p-Aminophenol 22.0 (0.202 mole) | 60.8 (0.44 mole) | Sulfolane 750 | 174.9 | 1,866 | 3.07 | H |
| 114.9 (0.40 mole) | Hydroquinone 33.0 (0.30 mole) | m-Aminophenol 22.0 (0.202 mole) | 58.0 (0.42 mole) | N—Methylpyrrolidone 600 | 132.8 | 1,443 | 3.08 | I |

TABLE 5

| Example No. | Kind and amount of ether sulfone diamine (g) | Kind and amount of tetracarboxylic anhydride (g) | Amount of phthalic anhydride | Kind and amount of phenolic solvent (g) | Amount of toluene (g) | Polyether sulfone imide | | |
|---|---|---|---|---|---|---|---|---|
| | | | | | | Amount (g) | NMP ηinh30° C. | Tg (°C.) |
| 7 | C 23.55 | Pyromellitic anhydride 2.18 | 1.8 | m-Cresol 225 | 60 | 21.7 | 0.506 | 247 |
| 8 | D 22.60 | " 4.36 | 2.2 | p-Chlorophenol 240 | 60 | 24.7 | (0.475)* | 267 |
| 9 | E 36.27 | " 2.18 | 0.9 | m-Cresol 220 | 50 | 35.8 | 0.538 | 220 |
| 10 | F 19.35 | " 4.36 | 0.8 | p-Chlorophenol 210 | 50 | 22.3 | (0.451)* | 256 |
| 11 | G 30.51 | " 2.18 | 1.4 | m-Cresol 200 | 50 | 31.0 | 0.632 | 241 |
| 12 | H 19.65 | " 2.18 | 0.8 | m-Cresol 200 | 50 | 20.9 | 0.590 | 248 |
| 13 | I 21.95 | 3,3',4,4'-Diphenyl tetracarboxylic anhydride 4.41 | 0.5 | m-Cresol 220 | 55 | 23.6 | 0.533 | 235 |

*measured in m-cresol/p-chlorophenol (1/5 by weight) at 30° C.

EXAMPLE 14

A flask equipped with a stirrer, a N₂ introducing inlet, a water collector having a condenser attached to its end and a thermometer was charged with 137.0 g (0.60 mole) of bisphenol A, 229.7 g (0.80 mole) of 4,4'-dichlorodiphenylsulfone, 121.6 g (0.88 mole) of anhydrous potassium carbonate, 1,000 g of sulfolane and 300 ml of chlorobenzene.

The temperature was gradually raised while it was fully stirred in a N₂ atmosphere, and a chlorobenzene-water azeotrope was distilled out. The chlorobenzene was recycled to the reaction system. When water was no longer distilled, recycling of the distilled chlorobenzene to the reaction system was stopped, and the chlorobenzene was distilled out. Then, the temperature of the inside of the flask was gradually raised to 190° C. and the reaction was carried out for additional 4 hours. The temperature was decreased to 150° C. and 300 ml of chlorobenzene and 44.1 g (0.404 mole) of p-aminophenol were added thereto. The reaction system was again heated with stirring, and a water-chlorobenzene azeotrope was distilled out. When water was no longer distilled out, chlorobenzene was distilled out from the reaction system. The resulting mixture was further heated at 190° to 195° C. for 4 hours with stirring, and the reaction was stopped. The reaction mixture was then poured into a large amount of water. The reaction product precipitated was separated by filtration and fully washed with water. By drying under vacuum, 319.2 g of ether sulfone diamine (J) was obtained. The diamine had an average molecular weight of 1,689 (theoretical molecular weight 1,652) determined by titration.

The resulting compound was an ether sulfone diamine represented by formula (III) wherein Ar¹ was

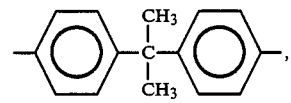

Ar² was

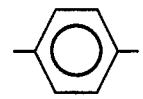

and l was 3.09. The results of elemental analysis of the compound are shown below.

| Found | C: 76.31%; H: 5.43%; N: 1.69% |
|---|---|
| Cald. | C: 76.40%; H: 5.25%; N: 1.66% |

Then, polymerization reaction was carried out in the same manner as in Example 5 using 37.16 g of ether sulfone diamine (J), 4.36 g of pyromellitic anhydride, 3.0 g of phthalic anhydride, 200 g of m-cresol and 50 g of toluene. Through substantially the same procedures for recovery and drying of the reaction product as in Example 5, 37.8 g of polyether sulfone imide having an inherent viscosity of 0.481 and Tg of 222° C. was obtained.

The copolymer was subjected to heat-pressing at 340° C. to prepare test samples, and their properties were measured. The results are shown below.

| | |
|---|---|
| Yield strength | 770 kg/cm$^2$ |
| Breaking strength | 630 kg/cm$^2$ |
| Breaking extention | 75% |
| Izod impact strength (notched) | 10 kg.cm/cm |

EXAMPLE 15

A 100 times scale-up procedure of Example 5 was carried out to obtain 26.2 kg of ether sulfone diamine (K). The diamine had an average molecular weight of 1,424 (theoretical molecular weight 1,406) by titration, which shows the recurring unit represented by formula (III) wherein Ar$^1$ and Ar$^2$ are

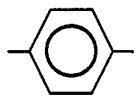

and l is 3.057.

Using ether sulfone diamine (K), polymerization was carried out in an extruder. Namely, 145.2 g of ether sulfone diamine (K) and 21.8 g of pyromellitic anhydride were charged in the form of mixed powders into a hopper of a dice-detached 13 m/m φ extruder which involved two temperature controlled parts (C$_1$ 200° C. for the hopper side; C$_2$ 250° C. for the outlet side) and a semi-melted resin was extruded by the screw rotation of 30 rpm. The residence time of the reaction product in the cylinder was about 3 minutes. The thus obtained spiral solid product was ground with a grinder to obtain 65 g of brown powder (Powder (I)).

A brown plate could be produced by heat-pressing the brown powder at 350° C. for 5 minutes.

The brown powder was not completely dissolved in N-methylpyrrolidone but was dissolved in a mixed solvent of m-cresol/p-chlorophenol (¼ by weight).

The brown powder was dissolved in the mixed solvent at a concentration of 5% by weight, and recovered using acetone as a non-solvent, followed by drying at 150° C. for 20 hours, whereby a polymer powder (Powder (II)) was obtained. This powder was uniformly dissolved in N-methylpyrrolidone, and the inherent viscosity was 0.742.

There were no differences in IR spectrum between powders (I) and (II), and the IR spectrum was exactly the same as that of the polyether sulfone imide obtained in Example 5.

EXAMPLE 16

Figure 3:
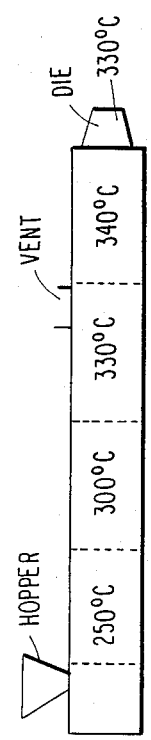
FIG. 3 illustrates the temperature setting in the vented extruder used in Example 16.

Using ether sulfone diamine (K), polymerization was carried out in an 40 m/m φ vented extruder which involved temperature controlled parts as shown in FIG. 3. Namely, 4,272 g of ether sulfone diamine (K), 641 g of pyromellitic anhydride and 17.8 g phthalic anhydride were fully mixed and charged into the hopper of the vented extruder equipped with a ful-flight type screw (L/D=30) wherein the vent part was vacuumed to 30 mmHg, and brown strand was extruded through the die by the screw rotation of 50 rpm. The residence time of the reaction product was about 7 minutes. About 500 g of the initial strand product was discarded, and about 2 kg of the subsequent strand product was use to prepare samples. The thus obtained strand product was cooled and cut with a pelletizer to obtain a pellet.

The pellet had an inherent viscosity of 0.461 and Tg of 240° C., and its IR spectrum was substantially the same as that of the copolymer obtained in Example 5.

The pellet was heat-pressed at 350° C. to obtain clear brown test samples, and their properties were measured. The results are shown below.

| | |
|---|---|
| Yield strength | 760 kg/cm$^2$ |
| Breaking strength | 680 kg/cm$^2$ |
| Breaking extention | 85% |
| Izod impact strength (notched) | 27 kg.cm/cm |

EXAMPLES 17 TO 20

Various ether sulfone diamines (L)-(N) were synthesized in the same way as in Example 1 from the aminophenols and dihydric phenols shown in Table 6 in the amounts indicated. The results are summarized in Table 6.

TABLE 6

| | | Synthesis of Ether Sulfone Diamine | | | |
|---|---|---|---|---|---|
| | | | Ether Sulfone diamine formed | | |
| Kind and amount of the aminophenol (g) | Kind and amount of the dihydric phenol (g) | Amount (g) | Average molecular weight | Structural formula (*) | n |
| p-Aminophenol 21.8 | 4,4'-Dihydroxy-diphenylsulfone 225.2 | 455.7 | 4,949 | L | 9.7 |
| p-Aminophenol 21.8 | Hydroquinone 99.1 | 328.4 | 3,592 | M | 9.7 |
| m-Aminophenol | 4,4'-Biphenol | 398.0 | 4,291 | N | 9.6 |

TABLE 6-continued

Synthesis of Ether Sulfone Diamine

| Kind and amount of the aminophenol (g) | Kind and amount of the dihydric phenol (g) | Ether Sulfone diamine formed | | | |
|---|---|---|---|---|---|
| | | Amount (g) | Average molecular weight | Structural formula (*) | n |
| 21.8 | 167.6 | | | | |

(*) $H_2N-\text{Ph}-O-[(\text{Ph}-SO_2-\text{Ph}-O)-]_{2n}-\text{Ph}-SO_2-\text{Ph}-O-\text{Ph}-NH_2$ (L)

$H_2N-\text{Ph}-O-[(\text{Ph}-SO_2-\text{Ph}-O-\text{Ph}-O)-]_n-\text{Ph}-SO_2-\text{Ph}-O-\text{Ph}-NH_2$ (M)

$H_2N-\text{Ph}-O-[(\text{Ph}-SO_2-\text{Ph}-O-\text{Ph}-\text{Ph}-O)-]_n-\text{Ph}-SO_2-\text{Ph}-O-\text{Ph}-NH_2$ (N)

Ether sulfone diamine (A) obtained in Example 1 and ether sulfone diamines (L), (M) and (N) obtained above were respectively reacted with the tetracarboxylic anhydrides shown in Table 7 in the amounts indicated in the same way as in Example 1 to synthesize polyether sulfone imides. The results are summarized in Table 7.

raised, and the reaction mixture was heated at 180° C. for 30 minutes to distill off toluene.

The reaction mixture obtained was cooled, and diluted with 100 ml of sulfolane. The precipitated sodium chloride was separated by filtration, and the filtrate was poured into 10 times its amount of water. The precipi-

TABLE 7

| Example No. | Kind and amount of the ether sulfone diamine (g) | Kind and amount of the tetracarboxylic anhydride (g) | Polyether sulfone imide | | | |
|---|---|---|---|---|---|---|
| | | | Amount (g) | NMP $\eta$inh 30° C. | Tg (°C.) | Structure (*) |
| 17 | A 87.32 | 3,3',4,4'-Diphenyltetracarboxylic anhydride 5.83 | 93.1 | 0.62 | 233 | O |
| 18 | L 98.98 | Pyromellitic anhydride 4.36 | 101.4 | 0.59 | 239 | P |
| 19 | M 71.84 | " 4.36 | 73.9 | 0.68 | 208 | Q |
| 20 | N 85.82 | " 4.36 | 89.0 | 0.59 | 232 | R |

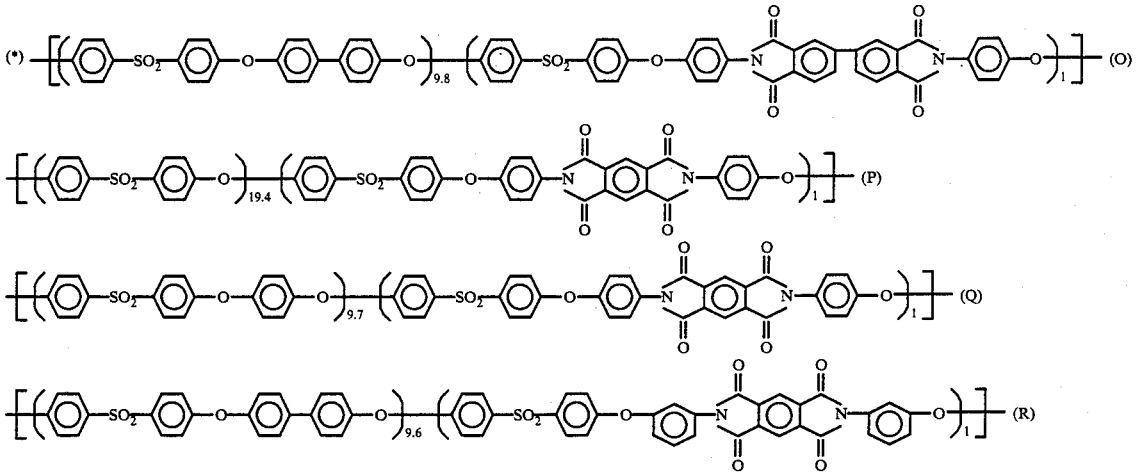

EXAMPLE 21

A sulfolane solution of polyether sulfone amide acid was obtained by performing the same reaction as in Example 2.

The temperature of the reaction solution was raised to 120° C., and 60 ml of toluene was added with stirring. The temperature was gradually raised, and at a temperature at which toluene distilled out, toluene and water were removed as an azeotrope. Toluene in an amount corresponding to the amount of toluene which distilled out was additionally supplied continuously to the reaction system. At 120° to 150° C. for 3 hours, toluene and water were distilled as an azeotrope and imidization was carried out. Then, the temperature was gradually tated copolymer was pulverized by a mixer and simultaneously washed with water. This operation was performed twice, and the copolymer was dried in vacuum at 180° C. for 20 hours to give 38.9 g of a yellow polymer having an inherent viscosity of 0.55. The infrared absorption spectrum of the resulting copolymer was substantially the same as that of the copolymer obtained in Example 1.

What is claimed is:

1. A copolymer produced by treating a polyimide with an excess of an end-capping agent, wherein said polyimide is composed of recurring units of the following formulae (I) and (II):

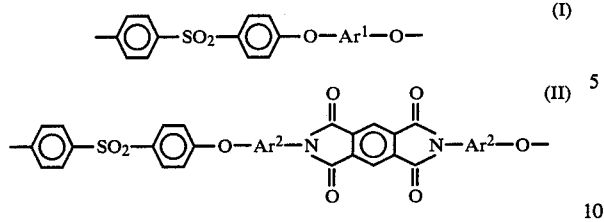 (I)

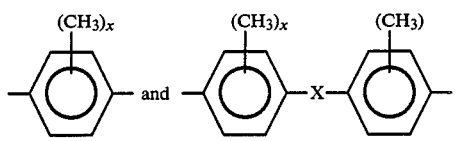 (II)

wherein Ar¹ represents a residue of a dihydric phenol, and Ar² represents a residue of an aminophenol and wherein said end-capping agent is a primary aromatic amine or an aromatic ortho-dicarboxylic anhydride.

2. The copolymer of claim 1 wherein Ar¹ is selected from the group consisting of

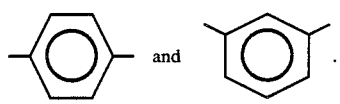

wherein X represents a direct bond, —O—, —S—, —SO₂—, —CO—, or an alkylene or alkylidene group having 1 to 6 carbon atoms, and x and y each represents 0, 1 or 2.

3. The copolymer of claim 1 wherein Ar² is selected from the group consisting of

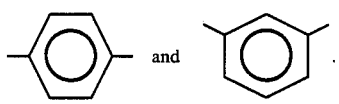

4. The copolymer of claim 2 wherein Ar² is selected from the group consisting of

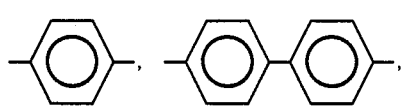

5. The copolymer of claim 1, wherein Ar¹ is selected from the group consisting of

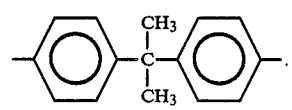

and

6. The copolymer of claim 1, wherein Ar² is

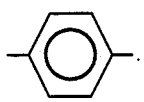

7. The copolymer of claim 5, wherein Ar² is

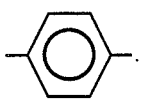

8. The copolymer of claim 1, wherein the mole ratio of the units of formula (I) to the units of formula (II) is from 95/5 to 20/80.

9. The copolymer of claim 8, wherein the mole ratio of the units of formula (I) to the units of formula (II) is from 90/10 to 40/60.

10. The copolymer of claim 1, wherein said primary aromatic amine is aniline and said aromatic ortho-dicarboxylic anhydride is phthalic anhydride.

11. The copolymer of claim 1, wherein said end-capping agent is an aromatic ortho-dicarboxylic anhydride.

12. The copolymer of claim 11, wherein said aromatic ortho-dicarboxylic anhydride is phthalic anhydride.

13. The copolymer of claim 1, wherein said copolymer has the following chain terminating group:

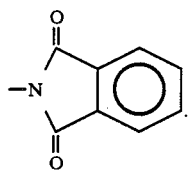

14. A copolymer produced by the process comprising (a) reacting an ether sulfone diamine represented by the formula (III)

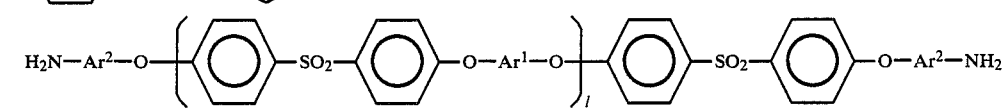 (III)

wherein Ar¹ represents a residue of a dihydric phenol, Ar² represents a residue of an aminophenol and l is an average value of the recurring unit

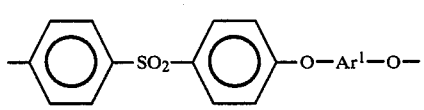

which is a real number of not more than 30, with pyromellitic acid dianhydride to obtain a copolymer having a terminal amine, a carboxylic anhydride group or both, and thereafter (b) treating the terminal amine, carboxylic anhydride group or both with an excess amount of an end-capping agent, wherein said end-capping agent is a primary aromatic amine or an aromatic ortho-dicarboxylic anhydride.

15. The copolymer of claim 14, wherein l is a real number represented by 0.25≦l≦19.

16. The copolymer of claim 14, wherein $Ar^1$ is

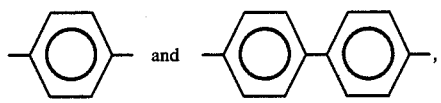

and $l$ is a real number represented by $0.67 \leq l \leq 9$.

17. The copolymer of claim 14, wherein said primary aromatic amine is aniline and said aromatic ortho-dicarboxylic anhydride is phthalic anhydride.

18. The copolymer as claimed in claim 14, wherein said end capping agent is an aromatic ortho-dicarboxylic anhydride.

19. The copolymer as claimed in claim 18, wherein said aromatic ortho-dicarboxylic anhydride is phthalic anhydride.

20. The copolymer of claim 14, wherein $Ar^1$ is selected from the group consisting of

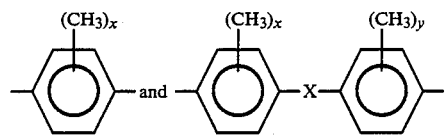

wherein X represents a direct bond, —O—, —S—, —SO$_2$—, —CO—, or an alkylene or alkylidene group having 1 to 6 carbon atoms, and x and y each represents 0, 1 or 2.

21. The copolymer of claim 14, wherein $Ar^2$ is selected from the group consisting of

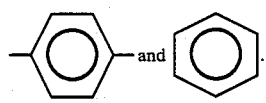

22. The copolymer of claim 14, wherein said pyromellitic acid dianhydride is reacted with an excess amount of said ether sulfone diamine and said end-capping agent is phthalic anhydride.

23. A process for producing a copolymer composed of recurring units of the following formulae (I) and (II) wherein $Ar^1$ represents a residue of a dihydric phenol, and $Ar^2$ represents a residue of an aminophenol, which comprises (a) reacting an ether sulfone diamine represented by the formula (III)

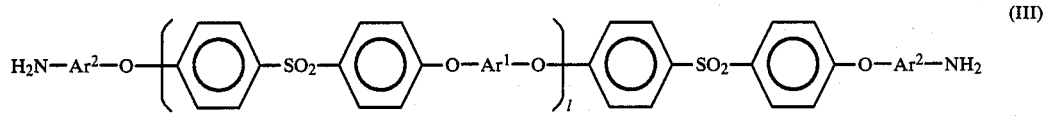 (III)

wherein $l$ is an average value of the recurring unit

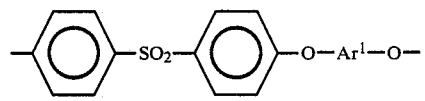

which is a real number of not more than 30, with pyromellitic acid dianhydride to obtain a copolymer having a terminal amine, carboxylic anhydride group or both, and thereafter (b) treating the terminal amine, carboxylic anhydride group or both with an excess amount of end-capping agent, wherein said end-capping agent is a primary aromatic amine or an aromatic ortho-dicarboxylic anhydride.

24. The process of claim 23, wherein said primary aromatic amine is aniline and said aromatic ortho-dicarboxylic anhydride is phthalic anhydride.

25. The process as claimed in claim 23, wherein said end-capping agent is phthalic anhydride.

26. The process as claimed in claim 23, wherein $Ar^1$ is selected from the group consisting of

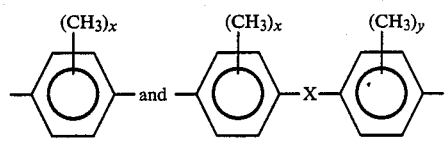

wherein X represents a direct bond, —O—, —S—, —SO$_2$—, —CO—, or an alkylene or alkylidene group having 1 to 6 carbon atoms, and x and y each represents 0, 1 or 2.

27. The copolymer of claim 23, wherein $Ar^2$ is selected from the group consisting of

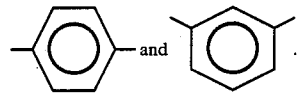

28. The process as claimed in claim 23, wherein said pyromellitic acid dianhydride is reacted with an excess amount of said ether sulfone diamine and said end-capping agent is phthalic anhydride.

* * * * *